United States Patent [19]
Kitagawa et al.

[11] Patent Number: 4,500,099
[45] Date of Patent: Feb. 19, 1985

[54] ELASTIC SUPPORTING AND SEALING MEMBER WITH THERMAL FOAMING STRIP

[75] Inventors: Katsutoshi Kitagawa; Kiyoshi Isogai; Nobuo Ohmori; Naka Takita; Makoto Okamoto; Itsuo Koga, all of Toyota; Kazuo Ito, Nagoya, all of Japan

[73] Assignees: Toyota Jidosha Kabushiki Kaisha, Toyota; Chuo Spring Co., Ltd., Nagoya, both of Japan

[21] Appl. No.: 472,183

[22] Filed: Mar. 4, 1983

[30] Foreign Application Priority Data

Jun. 15, 1982 [JP] Japan ................... 57-103168

[51] Int. Cl.³ ............................................. F16J 15/12
[52] U.S. Cl. ........................................ 277/228; 277/230; 277/DIG. 6; 264/257; 264/258
[58] Field of Search ............ 277/1, 12, 30, 101, 277/204, 227–230, 233, 234, 235 R, 235 A, 235 B, 236, DIG. 6; 264/103, 273, 257, 258, 324, 501, 502, 512, 516, 563

[56] References Cited

U.S. PATENT DOCUMENTS

| | | | |
|---|---|---|---|
| 2,686,747 | 8/1954 | Wurtz et al. | 277/228 X |
| 2,717,025 | 9/1955 | Jelinek | 277/228 X |
| 2,906,552 | 9/1959 | White | 277/228 |
| 2,924,471 | 2/1960 | Poltorak et al. | 277/230 X |
| 2,969,997 | 1/1961 | Runton et al. | 277/227 X |
| 3,124,502 | 3/1964 | Radke | 277/227 X |
| 3,125,346 | 3/1964 | Poltorak | 277/1 |
| 3,404,061 | 10/1968 | Shane et al. | 277/DIG. 6 X |
| 3,660,192 | 5/1972 | Smith et al. | 277/228 X |
| 4,330,136 | 5/1982 | Henson | 277/228 |

FOREIGN PATENT DOCUMENTS

| | | | |
|---|---|---|---|
| 972650 | 10/1964 | United Kingdom | 264/257 |
| 1113320 | 5/1968 | United Kingdom | 264/258 |
| 1377171 | 12/1974 | United Kingdom | 277/230 |
| 1559251 | 1/1980 | United Kingdom | 277/1 |
| 1567199 | 5/1980 | United Kingdom | 277/228 |

*Primary Examiner*—Robert S. Ward
*Attorney, Agent, or Firm*—Kenyon & Kenyon

[57] ABSTRACT

An elastic supporting and sealing member, for mutually supporting a first body and a second body, and for sealing the gap between the first body and the second body, includes a first portion and a second portion of wire net and a piece of thermal foaming material, between the first and the second wire net portion, which expands and foams when it is heated up. A method of making such a member includes the steps of flattening a tubular shaped piece of wire net, and of introducing a strip shaped piece of such thermal foaming material between the two sides of the flattened tube of wire net, so that the longitudinal directions of the strip shaped piece of thermal foaming material and of the flattened wire net tube substantially coincide.

15 Claims, 7 Drawing Figures

4,500,099

ELASTIC SUPPORTING AND SEALING MEMBER WITH THERMAL FOAMING STRIP

BACKGROUND OF THE INVENTION

The present invention relates to the field of sealing members, and more particularly relates to an elastic supporting and sealing member, which is placed between a first and a second member for gas-sealing the gap between them and also for mutually supporting them one from the other.

There is a known type of thermal foaming seal member for gas-sealing the gap between two bodies. Such a thermal foaming seal member is made from, for example, a mixture of vermiculite, ceramic binder, and organic binder. When such a thermal foaming seal member is heated, it foams and expands and then solidifies, and once it has solidified even when the temperature subsequently drops it does not change state or contract significantly. Further, it is quite resistant to heat. It is a known way for sealing a gap between two bodies to introduce such a thermal foaming seal member into the, in between the two bodies, before the thermal foaming seal member has thus been expanded, and then to heat the thermal foaming seal member in place so as to foam and expand it in situ. By doing this, the expansion is limited by the two bodies on either side of the gap, so that the resultant foamed mass of expanded material is closely conformed to the shape of the gap and tightly seals against the edges of the two bodies, thus forming a gas tight seal between the two bodies. Such a gas tight seal is stable even in a high temperature environment.

Further, there is a known way of supporting mutually two bodies one from the other, in which a wire net member is introduced into the gap between the two bodies, so that they are mutually elastically supported. A relevant example of this is the supporting of a solid catalyst body within the tubular outer casing of an automobile exhaust system catalytic converter. Such a monolithic catalyst body is typically quite fragile, and further typically has a substantially different coefficient of thermal expansion from that of the material of which the outer casing of the catalytic converter is made (typically stainless steel or the like), and so it is known and usual for the monolithic catalyst body to be made as a cylinder somewhat smaller than the inner cylindrical hole within the catalytic converter tubular casing, and for a wire net member of approximately the dimensions of the gap between the outer cylindrical surface of the monolithic catalyst body and the inner cylindrical surface of the tubular casing to be introduced thereinto, so as thereby to support the catalyst body elastically from the casing with a certain degree of resilience being available therebetween. Actually, the wire net member is made somewhat thicker than this gap between the catalyst body and the converter casing, so that when it is crammed thereinto a certain amount of resilient force is engendered, so as to provide a good support between the catalyst body and the casing.

In such a case, it is required to seal the cylindrical annular gap between the monolithic catalyst body and the inside of the tubular casing, in order to prevent exhaust gas passing therethrough and bypassing the catalyst body which it is desirable that said exhaust gas should pass through, and it is known and conventional to provide a thermal foaming seal member of the type described above for blocking this gap, inserted into the gap beside the above described wire net member. With such a construction, the exhaust gas is constrained to pass through the monolithic catalyst body, and also the monolithic catalyst body is resiliently and elastically supported within the catalytic converter casing by the frictional contact of the wire net member with the outside of the monolithic catalyst body and the inside of the catalytic converter casing. Thereby the monolithic catalyst body is well protected against vibration and mechanical shock, and also against booming or vibrations within the exhaust pipe.

However, in the conventional structure of this kind the thermal foaming seal member and the supporting wire net member are constructed separately and are inserted separately into the gap between the monolithic catalyst body and the catalytic converter casing, and this requires a good deal of work and trouble to manufacture and assemble these two separate members, and the products become expensive.

Further, the insertion of the thermal foaming seal member and the wire net member into the annular cylindrical gap between the monolithic catalyst body and the catalytic converter casing require a considerable amount of force. Since the thermal foaming seal member in its state before being heated to be foamed and expanded is very brittle, i.e. is very prone to breakage under tension and rubbing, there is a considerable risk of breaking the thermal foaming seal member during its insertion into place, because of the strong frictional force between it and the outer wall of the monolithic catalyst body and between it and the inner wall of the catalytic converter casing. A method that has in the past been adopted to reduce this frictional force is to coat the thermal foaming seal member with a low friction membrane on one or both of its sides, or to vacuum pack it with a low friction membrane, as a preparatory stage, before inserting it into the gap; however, even with such a troublesome expedient the fittability of the thermal foaming seal member is still unsatisfactory. Further, in order to fit the wire net member more easily into the gap without requiring too much deformation and compression thereof, it has been practiced to reduce the unstressed thickness of the wire net member to a value only just larger than the width of the gap; but this of course reduces the pressure that the wire net member exerts on the opposing walls of the monolithic catalyst body and the catalytic converter casing, and thus reduces its effectiveness as an elastic support for the catalyst body.

SUMMARY OF THE INVENTION

Accordingly, it is the primary object of the present invention to provide an elastic supporting and sealing member, for mutually supporting two bodies and for sealing the gap between these two bodies, which reduces or obviates these problems concerned with the prior art.

It is a further object of the present invention to provide such an elastic supporting and sealing member of the type above which is easy to insert into the gap between the two bodies.

It is a further object of the present invention to provide such an elastic supporting and sealing member of the type above which during insertion into the gap between the two bodies is not liable to be damaged by friction or rubbing.

It is a further object of the present invention to provide such an elastic supporting and sealing member of the type above, which provides more reliable mutual elastic support between the two bodies than has been available with the prior art.

It is a further object of the present invention to provide such an elastic supporting and sealing member of the type above, which provides more friction between itself and the two bodies.

It is a further object of the present invention to provide such an elastic supporting and sealing member of the type above, which provides more pressure against the opposing walls of the two bodies, thus making the mutual elastic supporting thereof more effective.

It is a further object of the present invention to provide such an elastic supporting and sealing member of the type above, which can during insertion be thinner than in the prior art.

It is a further object of the present invention to provide such an elastic supporting and sealing member of the type above, which can be expanded after insertion into the gap between the two bodies.

It is a further object of the present invention to provide such an elastic supporting and sealing member of the type above, which provides a good gas tight seal between the two bodies.

It is a further object of the present invention to provide such an elastic supporting and sealing member of the type above, in the use of which the effectiveness of the gas tight seal between the two bodies is not deteriorated even over a long period of service life.

It is a further object of the present invention to provide such an elastic supporting and sealing member of the type above, incorporating a thermal expansion type seal member of the type discussed above, in the use of which the expanded seal member is not deteriorated by impact of flowing gases, even over a long period of service life.

It is a further object of the present invention to provide such an elastic supporting and sealing member of the type above, which provides a good gas tight seal between the two bodies.

It is a further object of the present invention to provide such an elastic supporting and sealing member of the type above, which is particularly suitable for sealing the gap between a monolithic catalyst body and a tubular casing of a catalytic converter for a vehicle.

It is a further object of the present invention to provide such an elastic supporting and sealing member of the type above which is particularly suitable for use in a catalytic converter for a vehicle, and which can easily be fitted over said monolithic catalyst body.

It is a further object of the present invention to provide such an elastic supporting and sealing member of the type above, which is cheap.

It is a further object of the present invention to provide such an elastic supporting and sealing member of the type above, which is easily made and assembled.

It is another object of the present invention to provide a method of making an elastic supporting and sealing member of the type above.

It is a further object of the present invention to provide such a method of making an elastic supporting and sealing member of the type above, during the practice of which a piece of thermal expansion material utilized therein is not liable to be damaged by friction or rubbing.

It is a further object of the present invention to provide such a method of making an elastic supporting and sealing member of the type above, which is cheap and easy to practice.

According to the most general article aspect of the present invention, these and other objects relating to an article are accomplished by an elastic supporting and sealing member, for mutually supporting a first body and a second body, and for sealing the gap between said first body and said second body, comprising: a first portion and a second portion of wire net; and a piece of thermal foaming material between said first and said second wire net portion.

According to such a structure, since the elastic supporting and sealing member is thus constructed as an integral member, with the piece of thermal foaming material sandwiched between the first and second wire net portions, rather than the wire net member and the thermal foaming material being provided as two separate members as was the case in the above described type of prior art, therefore the operation of inserting this elastic supporting and sealing member between the first body and the second body is rendered much easier and more practicable, since only one operational stage is required. Further, since during this insertion the piece of thermal foaming material is protected by being sandwiched between the first and second portions of wire net, thereby it is not rubbed against the opposing surfaces of the first and the second body, and thus the problem of breaking of the piece of thermal foaming material during its insertion into the gap between the first and the second body is obviated.

Now, after the elastic supporting and sealing member is inserted into the gap between the first and the second member, it is heated up in order to foam the piece of thermal foaming material and to cause it to expand and seal the gap. When this happens, the expansion of the thermal foaming material pushes the first and second portions of wire net strongly away from one another and against the first and the second body, so that the frictional effect between these wire net portions and the bodies is greatly promoted, thus increasing the effectiveness of the mutual elastic supporting of the two bodies. Further, because of this effect the increase in the thickness of the elastic supporting and sealing member (i.e. in the distance between the first and second wire net portions) is greater and more reliable, and thus it is possible to make said elastic supporting and sealing member thinner, by comparison, than in the case of the prior art, which makes it correspondingly easier to insert into the gap between the two bodies.

Another advantage of the article according to the present invention is that when the thermal expansion material is heated up and foams and expands a part of it will naturally penetrate through the holes in the first and second pieces of wire net material on either side of it to bear against the first and the second bodies, and the shapes of these oozed through portions of the expanded thermal expansion material will naturally come to conform closely to the shapes of the portions of the first and second bodies with which they are in contact, thus providing a particularly good and reliable gas tight seal of the gap between the two bodies.

Now, during use of the elastic supporting and sealing member, since the thermal expansion material is contained and held within the first and second wire net portions, it is substantially protected against being deteriorated and coming off in crumbs or splinters, so that the durability of the sealing characteristics provided by the supporting and sealing member is maintained even over a long period of service. Further, since the thermal expansion material is surrounded by the wire net portions, particularly in a particular application in which such an elastic supporting and sealing member is used to provide a support and a seal in a catalytic converter of an automotive vehicle, the thermal expansion material is to some degree protected against the impact of hot exhaust gases by the resistance to the flow of such exhaust gases provided by these wire net portions, and accordingly this further promotes the durability of the sealing system as a whole.

Further, according to a particular aspect of the present invention, these and other objects relating to an article are more particularly and concretely accomplished by an elastic supporting and sealing member of the type described above, further comprising a low friction membrane which encloses said piece of thermal foaming material and is interposed between said piece of thermal foaming material and said first and second wire net portions.

According to such a structure, the piece of thermal foaming material is easily inserted into its position between the first and second wire net portions, during manufacture of the elastic sealing and supporting member.

Further, according to a particular article aspect of the present invention, these and other objects relating to an article are more particularly and concretely accomplished by an elastic supporting and sealing member of the type first described above, wherein said first and said second wire net portions are strip shaped, and wherein said piece of thermal foaming material is also strip shaped and extends in the longitudinal direction of said first and said second wire net strip portions; and wherein further the width of said strip shaped piece of thermal foaming material is less than the widths of said strip shaped first and second wire net portions, and wherein certain portions of said strip shaped first and second wire net portions oppose one another without the interposition of said strip shaped piece of thermal foaming material; and further wherein said certain portions of said strip shaped first and second wire net portions which oppose one another without the interposition of said strip shaped piece of thermal foaming material are formed with wrinkles; and optionally the wrinkles in said certain portions of said strip shaped first and second wire net portions which oppose one another without the interposition of said strip shaped piece of thermal foaming material may correspond to one another.

According to such structures, these wrinkles make the thickness of the combination of said certain portions of said strip shaped first and second wire net portions which oppose one another without the interposition of said strip shaped piece of thermal foaming material substantially greater, and increase their resilience, thus increasing the friction between said certain portions and the first and second bodies, which is effective for improving the mutual elastic support between the two bodies.

Further, according to a particular article aspect of the present invention, these and other objects relating to an article are more particularly and concretely accomplished by an elastic supporting and sealing member of any of the types above, wherein the two ends of at least one of said strip shaped first and second wire net portions are joined together, and wherein the two ends of said strip shaped piece of thermal foaming material are brought together into contiguity; and optionally wherein also the two ends of said strip shaped piece of thermal foaming material are formed into step shape and overlapped over one another; or alternatively optionally wherein also said two ends of said one of said strip shaped first and second wire net portions which are joined together are overlapped over one another.

According to such a structure, the elastic supporting and sealing member is formed into an annular structure, which as will be explained in what follows renders it particularly suitable for supporting and sealing an annular cylindrical shape gap, and in particular for sealing the gap between a monolithic catalyst body and a tubular outer casing of a catalytic converter for an automotive vehicle and for supporting the monolithic catalyst body from the tubular outer casing. The above described structure for overlapping the ends of the one of said strip shaped first and second wire net portions is helpful for contributing to the strength of the elastic supporting and sealing member as a whole and for thus improving its supporting function, and the above described structure for overlapping the ends of the said strip shaped piece of thermal foaming material is helpful for improving the sealing function of said piece of thermal foaming material.

Further, according to a particular article aspect of the present invention, these and other objects relating to an article are more particularly and concretely accomplished by an elastic supporting and sealing member of the type the third most proximately described above, wherein, with respect to the ring shape of said one of said strip shaped first and second wire net portions the ends of which are joined together produced by said joining together of said tow ends thereof, certain portions of said strip shaped first and second wire net portions which oppose one another without the interposition of said strip shaped piece of thermal foaming material are opened out towards an open end of said ring shape in a taper shape.

According to such a structure, the annular elastic supporting and sealing member, which as explained above is suitable for use for sealing the gap between a monolithic catalyst body and a tubular outer casing of a catalytic converter, is particularly easily slipped over the monolithic catalyst body during assembly of the catalytic converter. This is helpful for ensuring that the strip shaped piece of thermal foaming material is not damaged during such assembly.

According to the most general method aspect of the present invention, these and other objects relating to a method are accomplished by a method of making an elastic supporting and sealing member for mutually supporting a first body and a second body, and for sealing the gap between said first body and said second body, comprising the steps of: (a) flattening a tubular shaped piece of wire net; and (b) introducing a strip shaped piece of thermal foaming material between the two sides of said flattened tube of wire net, so that the longitudinal directions of said strip shaped piece of thermal foaming material and of said flattened wire net tube substantially coincide.

Accordingly to such a method, in fact either the tubular shaped piece of wire net can first be flattened and then subsequently the piece of thermal foaming material can be introduced between its two squashed together sides, or alternatively first the piece of thermal foaming material can be introduced into the tubular piece of wire net and subsequently the tubular wire net can be squashed and flattened, or as a further alternative these two processes can be performed simultaneously.

Further, according to a particular method aspect of the present invention, these and other objects relating to a method are more particularly and concretely accomplished by a method of making an elastic supporting and sealing member as described above, wherein said strip shaped piece of thermal foaming material is less wide than said flattened wire net tube.

According to such a method, in the finished flattened piece of wire net tube with the strip shaped piece of thermal foaming material inserted thereinto, side portions will be left which only include two sides of flattened wire net, with no thermal foaming material therebetween, since the piece of thermal foaming material is not as wide as the flattened wire net tube. These portions will be particularly suitable for performing the supporting function of the finished product, because their compressive strength will be great.

Further, according to a particular method aspect of the present invention, these and other objects relating to a method are more particularly and concretely accomplished by a method of making an elastic supporting and sealing member as described second most proximately above, further comprising the step of enclosing said strip shaped piece of thermal foaming material in a low friction membrane, performed before step (b); step (b) further including the process of inserting said low friction membrane between said two sides of said flattened tube of wire net while it is around said strip shaped piece of thermal foaming material.

According to such a method, the friction involved in inserting said strip shaped piece of thermal foaming material between the two sides of said flattened tube of wire net is reduced, which reduces the risk of damaging said thermal foaming material during such insertion.

Further, according to a particular method aspect of the present invention, these and other objects relating to a method are more particularly and concretely accomplished by a method of making an elastic supporting and sealing member as described above, further comprising the step of forming certain portions of said flattened tube of wire net which do not correspond to said strip shaped piece of thermal foaming material with wrinkles.

According to such a method, these wrinkles will make the thickness of the parts of said two sides of said flattened tube of wire net between which said strip shaped piece of thermal foaming material is not interposed and which include said certain wrinkled portions substantially greater, and will increase their resilience, thus increasing the friction between said certain portions and the first and second bodies, which will be effective for improving the mutual elastic support between the two bodies.

Further, according to a particular method aspect of the present invention, these and other objects relating to a method are more particularly and concretely accomplished by a method of making an elastic supporting and sealing member as described above, further comprising the step, hereinafter referred to as step (c), performed after step (b), of joining together the two ends of at least one side of said flattened tube of wire net, and of bringing together into contiguity the two ends of said strip shaped piece of thermal foaming material; and further optionally in step (c) the two ends of said strip shaped piece of thermal foaming material are formed into step shape and overlapped over one another; or alternatively optionally in step (c) two ends of said one side of said flattened tube of wire net which are joined together are overlapped over one another.

According to such a method, the elastic supporting and sealing member is formed into an annular structure, which will render it particularly suitable for supporting and sealing an annular cylindrical shape gap, and in particular for sealing the gap between a monolithic catalyst body and a tubular outer casing of a catalytic converter for an automotive vehicle and for supporting the monolithic catalyst body from the tubular outer casing. The above described method for overlapping the ends of the one of said strip shaped first and second wire net portions is helpful for contributing to the strength of the resulting elastic supporting and sealing member as a whole and for thus improving its supporting function, and the above described method for overlapping the ends of the said strip shaped piece of thermal foaming material is helpful for improving the sealing function of said piece of thermal foaming material, during use of the elastic supporting and sealing member.

Further, according to a particular method aspect of the present invention, these and other objects relating to a method are more particularly and concretely accomplished by a method of making an elastic supporting and sealing member as described above, wherein, with respect to the ring shape of said flattened tube of wire net produced by said joining together of said two ends thereof, certain portions of said flattened tube of wire net in which there is no interposition of said strip shaped piece of thermal foaming material are opened out towards an open end of said ring shape in a taper shape.

According to such a method, the resulting annular elastic supporting and sealing member, which as explained above is suitable for use for sealing the gap between a monolithic catalyst body and a tubular outer casing of a catalytic converter, may be particularly easily slipped over the monolithic catalyst body during assembly of the catalytic converter. This is helpful for ensuring that the strip shaped piece of thermal foaming material is not damaged during such assembly.

Further, according to a particular method aspect of the present invention, these and other objects relating to a method are more particularly and concretely accomplished by a method of making an elastic supporting and sealing member of the type first described above, wherein step (a) is performed before step (b), and during the performance of step (a) also a groove is formed in at least one of the flattened together sides of said tubular piece of wire net, into which groove said strip shaped piece of thermal foaming material is received during the subsequent performance of step (b).

According to such a method, this groove is very convenient for slipping in the strip shaped piece of thermal foaming material, without causing any particular frictional stress on the surface thereof, during step (b).

BRIEF DESCRIPTION OF THE DRAWINGS

The present invention will now be shown and described with reference to a preferred embodiment of the article and of the method thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims, in the drawings, like parts and features are denoted by like reference symbols in the various figures thereof, and:

DESCRIPTION OF THE PREFERRED EMBODIMENT

Figure 1:
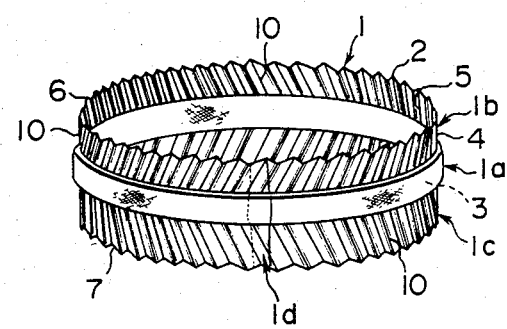
FIG. 1 is a perspective view of the preferred embodiment of the elastic supporting and sealing member according to the present invention, which is constructed as an annular support and seal ring for use in a catalytic converter for supporting a monolithic catalyst body within a tubular casing thereof and for sealing the gap therebetween.
Figure 2:
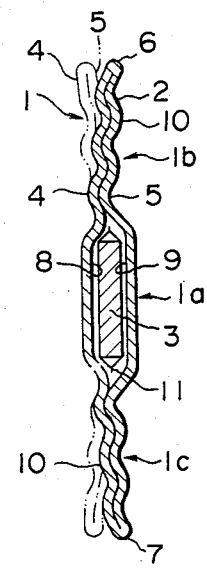
FIG. 2 is an enlarged sectional view through said preferred embodiment shown in FIG. 1, taken along a plane which includes the central axis of symmetry thereof.

The present invention will now be described with reference to a preferred embodiment thereof, and with reference to the appended drawings. FIG. 1 is a perspective view of this preferred embodiment of the elastic supporting and sealing member according to the present invention, which is an annular supporting and sealing ring 1 intended for use in a catalytic converter assembly which will be described later. This ring 1 is constructed with an axially intermediate portion 1a and with axially extreme portions 1b and 1c; and the portion of the ring 1 where a flat ribbon shape or strip used to form it is joined up to form its ring shape is denoted by the reference symbol 1d. As best seen in FIG. 2, which is a sectional view of the supporting and sealing ring 1 taken along a plane which includes its central axis, said sectional plane not passing through the joining portion 1d, the ring 1 comprises a wire net body member 2 and a strip of thermal foaming material 3. The wire net body member 2 in this preferred embodiment in fact is formed of a simple type of wire mesh, such as a lozengoidally woven mesh, and is made up of two annular cylindrical portions, an outer portion 4 and an inner portion 5, which are fitted one inside the other, in fact also being continuously connected together around the circumferences 6 and 7 of their axial ends according to the method of manufacture of this preferred embodiment which will be described later. Between the outer annular cylindrical portion 4 and the inner annular cylindrical portion 5 of the wire net body member 2 there is sandwiched the abovementioned strip 3 of thermal foaming material, which is also formed into an annular ring, said annular ring being however of much shorter axial dimension than the outer and inner cylindrical wire mesh member portions 4 and 5. Thus the axially intermediate portion 1a of the supporting and sealing ring 1 is essentially composed of an annular radially superposed sandwich of, in order inwards, the axially intermediate portion 8 of the outer cylindrical portion 4 of the wire net member 2, the annular strip 3 of thermal foaming material, and the axially intermediate portion 9 of the inner cylindrical portion 5 of the wire net member 2; while the axially extreme portions 1b and 1c of the supporting and sealing ring 1 are each essentially composed of a radially superposed sandwich of only an axially extreme portion of the outer cylindrical portion 4 and an axially extreme portion of the inner cylindrical portion 5 of the wire net member 2. In fact, a low friction membrane 11 is provided as enclosing the annular strip 3 between the wire net member portions 8 and 9, for a reason which will be explained later which is connected with the manufacture of this preferred embodiment, and also the axially extreme portions 1b and 1c of the supporting and sealing ring 1 are both formed with diagonally extending wrinkles 10, so as to be almost as thick as the axially intermediate portion 1a of the supporting and sealing ring 1 which has the annular strip 3 of thermally foaming material sandwiched in it. Further, the shown view of the section of the annular supporting and sealing ring 1 is in its state with the axial ends 5 and 6 of this section somewhat strained to the right of the figure, which is towards the central axis of the ring 1 as a whole, so as to render the ring 1 generally of a straight tubular shape; but in the unstressed state, as shown diagrammatically in FIG. 2 by the phantom lines, the axially extreme portions 1b and 1c of the support and seal ring 1 are somewhat opened outwards from the straight cylindrical form, so that the tubular shape of the ring 1 is somewhat opened out towards both its ends. This particular opened out taper form of this preferred embodiment is made in a manner that will be explained later, for a reason which will also be explained later.

Figure 6:
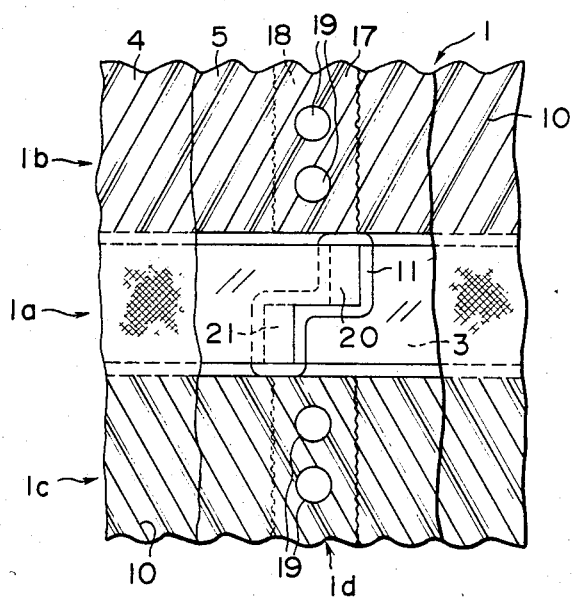
FIG. 6 is an enlarged plan view of the region where the ends of the squashed tube are subsequently joined up so as to make the annular ring shaped preferred embodiment shown in FIG. 1, particularly showing the configuration of the unfoamed thermal foaming seal member in this area.

In FIG. 6, the joined up portion 1d of the annular ring 1 is shown in more detail. In fact, the outer cylindrical portion 4 of the wire net member 2 is somewhat cut back away from the joined up portion 1d, while the inner cylindrical portion 5 is overlapped upon itself at this portion 1d as seen in the radial direction, the two overlapped portions of the inner cylindrical portion 5 being denoted in the figure by the reference numerals 17 and 18. These two overlapped portions 17 and 18 are secured together by a plurality of spot welds 19 which are only provided in the axially extreme portions 1b and 1c of the supporting and sealing ring 1 and not in its axially intermediate portion 1a, for reasons of convenience of manufacturability. Further, in this joined up portion 1d, the ends of the annular strip 3 of thermally foaming material are cut into a stepped form, i.e. into steps 20 and 21, which are overlapped over one another as seen in the axial direction but not as seen in the radial direction; this is done in order to maintain good gas sealing effectiveness in this region. Further, in this area the low friction membrane 11 is cut so as to substantially overlap itself as seen in the radial direction, as indicated by the dashed lines in FIG. 6.

Figure 7:
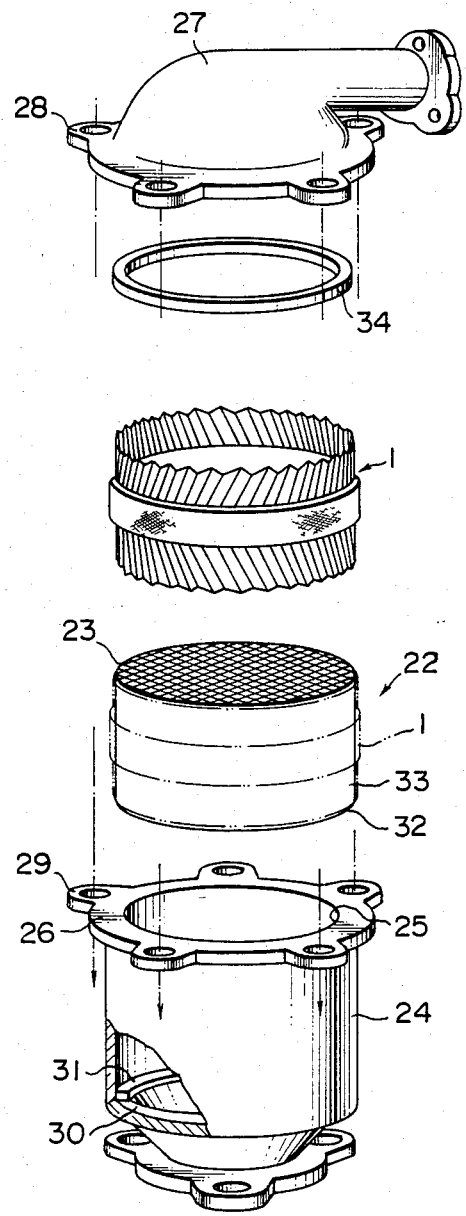
FIG. 7 is an explanatory exploded perspective view of a catalytic converter for a vehicle, showing the intended use of said preferred embodiment of the elastic supporting and sealing member according to the present invention shown in FIG. 1, for supporting a monolithic catalyst body within the casing of said catalytic converter and for providing a seal therebetween, in the state before the thermal foaming seal member included in said preferred embodiment has been heated up and foamed.

Next, in FIG. 7, the intended principal particular use of this supporting and sealing ring 1 for holding a monolithic catalyst body in a catalytic converter for an automotive vehicle, and for being fitted in an annular gap between the monolithic catalyst body and the tubular outer casing thereof and for supporting the catalyst body within this outer casing and for sealing the gap therebetween, is explanatorily shown.

In this figure, the reference numeral 22 denotes the catalytic converter as a whole, which is shown in an exploded fashion. A monolithic catalyst body 23 is formed as a cylindrical mass, and is received within a cylindrical outer casing 24 of the catalytic converter an inner cylindrical cavity 25 of which is slightly larger in radius than the outer cylindrical surface of said monolithic catalyst body 23, thus leaving a narrow annular cylindrical space therebetween. The lower end in the figure of the cylindrical cavity 25 is tapered down in a cone shape which ends in an exhaust gas venting port (not shown in the figure), initially presenting an annular thrust receiving end wall 30, and a cushioning retainer member 31, also of a generally annular shape, is abutted against said end wall 30, between said annular end wall 30 and the lower end in the figure of the monolithic catalyst body 23. The axially other end of the cylindrical cavity 25 is formed as an opening 26 of the same diameter as said cylindrical cavity 25, surrounded by a fitting flange 29. This opening 26 serves both as an opening for inserting and removing the monolithic catalyst 23 and as an mode of entry for exhaust gases into the cavity 25. An end cap 27 is provided which has a fitting flange 28 adapted to mate against and to be bolted to the flange 29 of the converter casing 24, and which also is formed with an exhaust gas admitting port, not particularly shown in the figure, either. A cushioning retainer ring 34 generally similar to the retainer ring member 31 is provided between an end wall (not visible in the figure) in said end cap 27 and the upper end in the figure of the monolithic catalyst body 23. And the supporting and sealing ring 1, as schematically indicated in FIG. 7 by the double dotted lines, is fitted over the outer cylindrical surface of the monolithic catalyst body 24, between it and the inner cylindrical surface of the cavity 25 of the casing 24, so as to support said monolithic catalyst body 23 from said casing 24, and so as also to provide a substantially gas tight sealing effect therebetween during use, as will be explained shortly.

Now, during assembly of this catalytic converter 22, first the supporting and sealing ring 1 is fitted over the cylindrical monolithic catalyst body 23, while these two are outside the cylindrical cavity 25 of the casing 24, and then subsequently the monolithic catalyst body 23 with the ring 23 mounted thereover are together slid into the cylindrical cavity 25, and then the fitting flange 28 of the end cap 27 is bolted by bolt and nut assemblies which are not shown in FIG. 7 to the fitting flange 29 of the casing 24, thereby axially clamping the monolithic catalyst body 23 between the axially opposed end wall 30 of the casing 24 and the end wall within the end cap 27 which is not visible in the figure, with the cushioning interposition of the two respective retainer rings 31 and 34. After this assembly process the mass of the monolithic catalyst body 1 is thus securely supported with regard to movement in its radial direction within the cavity 25 of the casing 24 by the wire net portion of the supporting and sealing ring 1 which braces between the outer cylindrical surface of the catalytic body 23 and the inner cylindrical surface of the cavity 25, thereby preventing shocks and vibration from being able to crack or damage the monolithic catalyst body 23, which typically is quite brittle and delicate.

Next, when the catalytic converter 22 is fitted to a motor vehicle, and when the internal combustion engine of the vehicle is first started up, naturally the catalytic converter 22 as a whole gets quite hot. This causes the annular strip 3 of thermally foaming material of the supporting and sealing ring 1 to expand and foam and become thermally processed in a per se well known manner, so as to form a good and secure gas tight seal between the outer cylindrical surface of the catalytic body 23 and the inner cylindrical surface of the cavity 25, intercepting between the axially upper portion in the figure of the annular cylindrical space between these two surfaces and the axially lower portion thereof and thereby preventing the flow of exhaust gas through this annular cylindrical space in the downward axial direction in the figure which if allowed would permit such exhaust gas to flow from the inlet to the outlet of the catalytic converter 22 while bypassing the monolithic catalyst body 23. During this foaming and expanding action of the annular strip 3 of thermally foaming material, it pushes the outer and inner portions 4 and 5 of the wire net member 2 respectively against the inner cylindrical surface of the cavity 25 and the outer cylindrical surface of the catalytic body 23, thus improving the elastic support between these two surfaces, and also some of this foaming material will ooze through the interstices of these wire net mesh portions and will press directly against these cylindrical surfaces, thus perfecting the above sealing effect between the monolithic catalyst body 23 and the casing 24.

Now, during the above described operation of assembly of the catalytic converter 22, the fitting of the supporting and sealing ring 1 over the cylindrical monolithic catalyst body 23, while these two are outside the cylindrical cavity 25 of the casing 24, is substantially aided by the particular constructional feature, explained above, that in the unstressed state, as shown diagrammatically in FIG. 2 by the phantom lines, the axially extreme portions 1b and 1c of the support and seal ring 1 are somewhat opened outwards from the straight cylindrical form, so that the tubular shape of the ring 1 is somewhat opened out towards both its ends. This form is obtained by proper configuration of the diagonally extending wrinkles 10 in the the axially extreme portions 1b and 1c of the supporting and sealing ring 1, and makes it much easier to slide the supporting and sealing ring 1 over the outer surface of the catalyst body 23, which is a delicate and critical fitting operation, since friction between these two members during fitting them together is liable, if excessive, to damage either the monolithic catalyst body 1 or the thermal foaming material strip 3 of the ring 23. This is a valuable constructional aspect of the shown preferred embodiment of the present invention.

Now, referring to FIGS. 3–5, the method of manufacture of the preferred embodiment of the elastic supporting and sealing member according to the present invention described above will be described; this method of manufacture being the preferred embodiment of the method according to the present invention.

Figure 3:
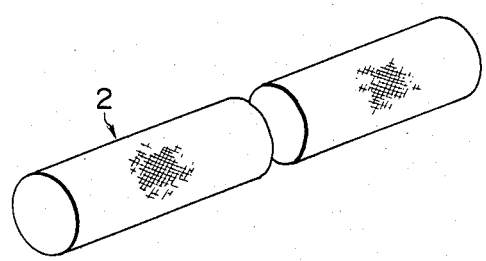
FIG. 3 is a perspective view of a metal mesh tube which is about to be used for a method of manufacture of said preferred embodiment of the article according to the present invention, which is the preferred embodiment of the method of manufacture according to the present invention.

First, a wire net member 2 is produced by some per se well known weaving and cutting process, in a tubular form as shown in FIG. 3, and of a length slightly longer than the final required circumference of the annular supporting and sealing ring 1, i.e. than the circumference of the monolithic catalytic body 23 of the catalytic converter 22 for which this supporting and sealing ring 1 is intended to be utilized.

Figure 4:
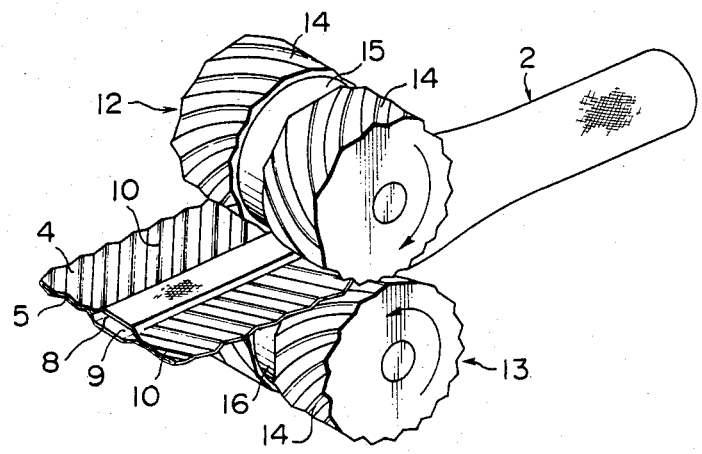
FIG. 4 is a perspective view, showing the metal mesh tube of FIG. 3 being partially squashed between two shaped rollers, during the process of manufacture of said preferred embodiment.

Next, this tubular wire net member 2 is squashed between two rollers 12 and 13 of particular shapes, as shown in FIG. 4, so as to produce a flattened ribbon shape wire net member of the general cross section shown in FIG. 2 and described above. Each of the rollers 12 and 13, as diagrammatically shown in FIG. 4, has an axially central cut away or grooved portion, respectively denoted by the reference numerals 15 and 16, and the portions of these rollers 12 and 13 contiguous to these axially central cut away portions 15 and 16 are formed with diagonally extending ridges 14, which are of the form of helically cut grooves. Thereby, according to this particular roller shape, as the wire net member 2 passes between the rollers 12 and 13 and is squashed therebetween, the axially central cut away portions 15 and 16 do not squash together the central portion of the wire net member 2 completely, so as to leave the axially central wire net member portions 8 and 9 somewhat separated from one another as seen in the cross section of FIG. 2, i.e. in a groove like form, while on the other hand the portions of these rollers 12 and 13 contiguous to these axially central cut away portions 15 and 16 completely squash together the other portions of the wire net member 2 so as completely to close up the axially extreme portions 1b and 1c of the wire net member 2 again as seen in the cross section of FIG. 2. As this occurs, the diagonally extending ridges 14 simultaneously form the diagonally extending wrinkles 10 in the the axially extreme portions 1b and 1c of the wire net member 2. In the shown preferred embodiment of the present invention, by suitable tapering of the ridge bearing portions of the rollers 12 and 13 contiguous to the axially central cut away portions 15 and 16, a slight twist is imparted to the portions of the wire net member 2 which are impressed with these wrinkles 10, so that the axially extreme portions 1b and 1c of the finally produced support and seal ring 1, as explained above, are somewhat opened outwards from the straight cylindrical form, so that the tubular shape of the ring 1 is somewhat opened out towards both its ends.

Next, the thus squash formed wire net member 2 is slightly opened out, so that the space between the axially central wire net member portions 8 and 9 is slightly temporarily increased; this may be done by the insertion of a former member between these portions 8 or 9, for example.

Figure 5:
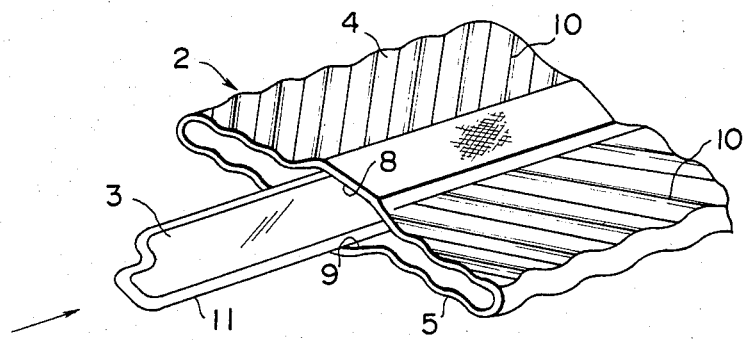
FIG. 5 is an enlarged perspective view of one end of the resulting partially squashed metal mesh tube, showing an unfoamed thermal foaming seal member being inserted between the walls thereof, during the manufacture of said preferred embodiment.

Next, as shown in FIG. 5, the strip 3 of thermal foaming material, enclosed in the aforementioned wrapper 11 of low friction material, is slid into the slot shaped gap between the axially central wire net member portions 8 and 9 of the wire net member 2, i.e. along the groove forms delimited by these axially central portions 8 and 9. This operation is considerably aided by the provision of the low friction material wrapper 11, since at this time, before foaming thereof, the strip 3 of thermal foaming materials is quite fragile and sensitive to frictional damage and scuffing.

If the elastic supporting and sealing member according to the present invention were to be used for sealing the gap between two plane members and for mutually supporting them, then the fabrication operation might now be essentially complete; but since in the present preferred embodiment the elastic supporting and sealing member according to the present invention is required in the form of a ring, then the ends of the wire net member 2 are joined together as shown in FIG. 5, after cutting away the one sides of the two ends of the wire net member 2 and after cutting the ends of the strip 3 of thermal foaming material into the step forms 20 and 21. In fact, these cutting operations may have been made before the squashing operation between the rollers 12 and 13 shown in FIG. 4 and described above. The details of this operation of joining the ends of the wire net member 2 to form the ring 1 will be easily supplemented by one of ordinary skill in the art without undue experimentation, based upon the disclosure herein. Thus the supporting and sealing ring 1 shown in FIGS. 1, 2, 6, and 7 is completed.

According to the above described structure for the elastic supporting and sealing member which is constituted by the ring 1, since this elastic supporting and sealing member is thus constructed as an integral member, with the piece of thermal foaming material 3 sandwiched between the outer and inner wire net portions 4 and 5, rather than the wire net member 2 and the thermal foaming material 3 being provided as two separate members as was the case in the prior art, therefore the operation of inserting supporting and sealing ring 1 between the monolithic catalyst body 23 and the inner cylindrical surface of the cavity 25 of the casing 24 is rendered much easier and more practicable, since only one operation is required. Further, since during this insertion the piece of thermal foaming material 3 is protected by being sandwiched between the outer and inner portions 4 and 5 of the wire net member 2, thereby it is not rubbed against the opposing cylindrical suffaces of the monolithic catalyst body 23 of the casing 24, and thus the problem of breaking of the piece of thermal foaming material 3 during its insertion into the gap between the monolithic catalyst body 23 and the casing 24 is obviated.

Now, after the supporting and sealing ring 1 is inserted into the gap between the monolithic catalyst body 23 and the catalytic converter casing 24, as stated above it is heated up by operation of the internal combustion engine of the automotive vehicle in order to foam the piece of thermal foaming material 3 and to cause it to expand and seal the gap. When this happens, the expansion of the thermal foaming material 3 pushes the outer and inner portions 4 and 5 of the wire net member 2 strongly away from one another and respectively against the the opposing cylindrical surfaces of the monolithic catalyst body 23 and the catalytic converter casing 24, so that the frictional effect between these wire net portions and the catalyst body 23 and the casing 24 is greatly promoted, thus increasing the effectiveness of the elastic support of the catalyst body 23. Further, because of this effect the increase in the thickness of the supporting and sealing ring 1 is comparatively great, and thus it is possible to make said supporting and sealing member ring 1 quite thin in the radial direction, which makes it correspondingly easier to insert into the gap between the catalyst body 23 and the casing 24.

Now, during use of the supporting and sealing ring 1, since the thermal expansion material 3 is contained and held within the outer and inner portions 4 and 5 of the wire net member 2, it is substantially protected against being deteriorated and coming off in crumbs or splinters, so that the durability of the sealing characteristics provided by the supporting and sealing ring 1 is maintained even over a long period of service. Further, since the thermal expansion material 3 is flanked on both of its axial sides by the axially extreme portions 1b and 1c of the ring 1 which are formed essentially only of wire mesh, the thermal expansion material 3 is to some degree protected against the impact of hot exhaust gases by the resistance to the flow of such exhaust gases provided by these axially extreme wire net portions 1b and 1c, and accordingly this further promotes the durability of the sealing system as a whole.

Although the present invention has been shown and described with reference to preferred embodiments of the article thereof and of the method of manufacture of said article, and in terms of the illustrative drawings, it should not be considered as limited thereby. Various possible modifications, omissions, and alternations could be conceived of by one skilled in the art to the form and the content of any particular embodiment, without departing from the scope of the present invention. For instance, although in the shown preferred embodiment of the method according to the present invention the tubular wire net member 2 was first flattened, and then the strip 3 of thermal foaming material was inserted thereinto, this particular operational order is not essential to the present invention, and these processes might be performed in the reversed order, or perhaps simultaneously, in alternative method embodiments. Therefore it is desired that the scope of the present invention, and of the protection sought to be granted by Letters Patent, should be defined not by any of the perhaps purely fortuitous details of the shown embodiment, or of the drawings, but solely by the scope of the appended claims, which follow.

What is claimed is:

1. An elastic supporting and sealing member for mutually supporting a first body with respect to a second body and for sealing a gap between said first body and said second body, the member comprising:
    a first and a second strip shaped portion of wire net; and
    a strip shaped piece of thermal foaming material disposed between said first and said second wire net portions to extend in the longitudinal direction of said first and said second strip shaped wire net portions, said first and said second wire net portions extending laterally beyond the lateral extent of said strip shaped piece of thermal foaming material on opposite sides thereof so as to provide laterally extreme portions where said first and second wire net portions oppose one another without the interposition of said piece of thermal foaming material.

2. An elastic supporting and sealing member for mutually supporting a first body with respect to a second body and for sealing a gap between said first body and said second body, the member comprising:
    a first portion and a second portion of wire net;
    a piece of thermal foaming material between said first and second wire net portions; and
    a low friction membrane which encloses said piece of thermal foaming material and is interposed between said piece of thermal foaming material and said first and second wire net portions.

3. An elastic supporting and sealing member for mutually supporting a first body with respect to a second body and for sealing a gap between said first body and said second body, the member comprising:
    first and second strip shaped portions of wire net opposing one another and
    a strip shaped piece of thermal foaming material extending between, and in the longitudinal direction of, said first and second wire net strip portions, wherein the width of said strip shaped piece of thermal foaming material is less than the widths of said strip shaped first and second wire net portions, such that certain parts of said strip shaped first and second wire net portions oppose one another without the interposition of said strip shaped piece of thermal foaming material, and wherein said certain parts of said strip shaped first and second wire net portions which oppose one another without the interposition of said strip shaped piece of thermal foaming material are formed with wrinkles.

4. An elastic supporting and sealing member according to claim 3, wherein the wrinkles in said certain portions of said strip shaped first and second wire net portions which oppose one another without the interposition of said strip shaped piece of thermal foaming material correspond to one another.

5. An elastic supporting and sealing member according to claim 3, wherein said wrinkled portions of said strip shaped first and second wire net portions which oppose one another without the interposition of said strip shaped piece of thermal foaming material, in the substantially unstressed state, deviate from the general plane of the portions of said first and second wire net portions between which lies said strip shaped piece of thermal foaming material.

6. An elastic supporting and sealing member according to claim 4, wherein sAid wrinkled portions of said strip shaped first and second wire net portions which oppose one another without the interposition of said strip shaped piece of thermal foaming material, in the substantially unstressed state, deviate from the general plane of the portions of said first and second wire net portions between which lies said strip shaped piece of thermal foaming material.

7. An elastic supporting and sealing member according to any one of claims 3, 4, 5 or 6, wherein the total overall effective thickness of the combination of said wrinkled portions of said strip shaped first and second wire net portions which oppose one another without the interposition of said strip shaped piece of thermal foaming material is approximately the same as the total overall effective thickness of the combination of said portions of said first and second wire net portions between which lies said strip shaped piece of thermal foaming material and said strip shaped piece of thermal foaming material.

8. An elastic supporting and sealing member according to any one of claims 3, 4, 5, or 6, wherein the two ends of at least one of said strip shaped first and second wire net portions are joined together, and wherein the two ends of said strip shaped piece of thermal foaming material are brought together into contiguity.

9. An elastic supporting and sealing member for mutually supporting a first body with respect to a second body and for sealing a gap between said first body and said second body, the member comprising:

first and second strip shaped portions of wire net opposing one another and a strip shaped piece of thermal foaming material extending between, and in the longitudinal direction of, sAid first and second wire net strip portions, wherein the two ends of at least one of said strip shaped first and second wire net portions are joined together, and wherein the two ends of said strip shaped piece of thermal foaming material are brought together into contiguity.

10. An elastic supporting and sealing member according to claim 9, wherein the two ends of said strip shaped piece of thermal foaming material are formed into step shape and overlapped over one another.

11. An elastic supporting and sealing member according to claim 9, wherein said two ends of said one of said strip shaped first and second wire net portions which are joined together are overlapped over one another.

12. An elastic supporting and sealing member according to claim 10, wherein, with respect to the ring shape of said piece of thermal foaming material produced by said bringing together of said two ends thereof, the two ends of said strip shaped piece of thermal foaming material are overlapped over one another in the axial direction but not in the radial direction.

13. An elastic supporting and sealing member according to claim 11, wherein, with respect to the ring shape of said one of said strip shaped first and second wire net portions the ends of which are joined together produced by said joining together of said two ends thereof, the two ends of said one of said strip shaped first and second wire net portions the ends of which are joined together are overlapped over one another in the radial direction but not in the axial direction.

14. An elastic supporting and sealing member according to claim 9, wherein, with respect to the ring shape of said one of said strip shaped first and second wire not portions the ends of which are joined together produced by said joining together of said two ends thereof, certain portions of said strip shaped first and second wire net portions which oppose one another without the interposition of said strip shaped piece of thermal foaming material are opened out towards an open end of said ring shape in a taper shape.

15. An elastic supporting and sealing member for mutually supporting a first body with respect to a second body and for sealing a gap between said first body and said second body, the member comprising:

first and second strip shaped portions of wire net opposing one another and a strip shaped piece of thermal foaming material extending between, and in the longitudinal direction of, said first and second wire net strip portions, wherein the width of said strip shaped piece of thermal foaming material is less than the widths of said strip shaped first and second wire net portions, such that certain parts of said strip shaped first and second wire net portions oppose one another without the interposition of said strip shaped piece of thermal foaming material, wherein the two ends of at least one of said strip shaped first and second wire net portions are joined together, and wherein the two ends of said strip shaped piece of thermal foaming material are brought together into contiguity.

* * * * *

UNITED STATES PATENT AND TRADEMARK OFFICE
CERTIFICATE OF CORRECTION

PATENT NO. : 4,500,099

DATED : February 19, 1985

INVENTOR(S) : K. Kitagawa et al.

It is certified that error appears in the above-identified patent and that said Letters Patent is hereby corrected as shown below:

```
Column 1, line 22, change "the," to --the gap--.

Column 1, line 23, change "in between" to --between--.

Column 3, line 49, change "above which" to --above, which--.

Column 6, line 34, change "tow" to --two--.

Column 6, line 62, change "Accordingly" to --According--.

Column 11, line 36, change "an" to --a--.

Column 11, line 49, change "24" to --23--.

Column 12, line 2, change "body 1" to --body 23--.

Column 12, line 54, omit the first "the" in the line.

Column 13, line 39, omit the first "the" in the line.

Column 14, line 39, change "suffaces" to --surfaces--.
```

UNITED STATES PATENT AND TRADEMARK OFFICE
CERTIFICATE OF CORRECTION

PATENT NO. : 4,500,099
DATED : February 19, 1985
INVENTOR(S) : K. Kitagawa et al.

It is certified that error appears in the above-identified patent and that said Letters Patent is hereby corrected as shown below:

```
Column 14, line 40, change "23 of the" to --23 and the--.

Column 14, line 48, change "above it" to --above, it--.

Column 14, line 62, change "effect the" to --effect, the--.

Column 16, line 39, change "sAid" to --said--.

Column 17, line 5, change "sAid" to --said--.

Column 18, line 5, change "not" to --net--.
```

Signed and Sealed this

First Day of October 1985

[SEAL]

Attest:

Attesting Officer

DONALD J. QUIGG

Commissioner of Patents and Trademarks—Designate